3,211,804
METHOD FOR MODIFYING OLEFIN POLYMERS, OXIDIZED OLEFIN POLYMERS AND OLEFIN POLYMERS CONTAINING CARBOXYL AND HYDROXYL GROUPS WITH POLYMETHYLOLATED PHENOLIC AND PEROXIDE CROSS - LINKING AGENTS AND PRODUCTS PRODUCED THEREBY
Bernard O. Baum, Plainfield, and Lawrence G. Imhof, Westfield, N.J., assignors to Union Carbide Corporation, a corporation of New York
No Drawing. Filed June 19, 1962, Ser. No. 203,480
6 Claims. (Cl. 260—848)

This invention relates to modified olefin polymers exhibiting improved clarity stress cracking resistance and adhesion to a wide variety of substrates. More particularly, the invention relates to a method for modifying olefin polymers to exhibit one or more of the above characteristics and to olefin polymers so modified.

The term "olefin polymers" is used in the present specification and claims to denote normally solid homopolymers of alpha mono-olefinically unsaturated hydrocarbons as well as normally solid copolymers thereof, with one or more other organic compounds copolymerizable therewith which contain polymer producing unsaturation, such as is present for example in carbon monoxide and formaldehyde and in compounds containing the ethylene linkage $>C=<$ e.g., styrene, vinyl stearate, butene, vinyl acetate, vinyl formate, methyl acrylate, monobutyl maleate, 2-ethyl hexyl acrylate, N-methyl-N-vinyl acetamide acrylic acid, ethyl acrylate, methacrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred olefin polymers in this invention contain at least 10 percent of weight of a combined alpha mono-olefinically unsaturated hydrocarbon having from 2 to 4 carbon atoms inclusive, i.e., butene-1, propylene and especially ethylene.

Olefin polymers are desirably modified for various end uses, for example, to provide increased molecular weight, higher thermal deformation temperatures, improved clarity and enhanced solvent resistance. Heretofore, such modification has been carried out by crosslinking the olefin polymer as by irradiation, or by treatment with peroxides. Peroxide crosslinking accomplishes the desired improvements in olefin polymers but has undesirable side effects such as the leaving of residues which may adversely affect stability, electrical and permeability properties.

As packaging materials, olefin polymer films are characteristically superior to cellulosic and metallic materials in flexibility, resistance to tear and in being unaffected by moisture and chemically active environments. Cellulosic and metallic packaging materials, however, are generally superior to olefin polymer films in shock-absorbing properties and are more easily handled in automatic packaging machinery. A combination of the properties of these packaging materials is possible by laminating or coating the olefin polymer on the cellulosic or metallic material. The general inertness of the olefin polymers to solvents and adhesives, however, has thus far substantially prevented obtaining of suitable laminated and coated substrates except by costly pretreatment of the olefin polymer surface, e.g., etching with chronic acid, subjecting to corona discharge and flame treatment.

It is an object, therefore of the present invention to provide olefin polymers exhibiting increased molecular weight, higher thermal deformation temperatures, improved clarity and enhance solvent resistance and which are not reduced in stability or permeability.

It is another object to provide olefin polymers which exhibit good adhesion to both porous and nonporous substrates without the need of surface treatment of the polymer after shaping, which are adapted to use in coating and laminate constructions, It is another object to provide a method for modifying olefin polymers to impart increased molecular weight, higher thermal deformation temperature characteristics, improved clarity and enhanced solvent resistance.

It is another object to provide a method for modifying ethylene polymers to impart improved adhesional characteristics.

It has now been discovered that surprising and marked adhesional properties are imparted to ethylene polymers by reacting the ethylene polymer with a polymethylolated phenolic material containing one or more phenolic nuclei and having substituted directly on the phenolic nuclei at least two methylol groups (—CH$_2$OH) on the average, preferably a mononuclear phenol having three methylol groups thereon.

It has further been discovered that increased molecular weight, higher thermal deformation temperature characteristics, improved clarity and enhanced solvent resistance are imparted to olefin polymers having a peroxide content (measured as described below) of from 0.15 to 3.5 milligrams (mg.) peroxide per gram resin and/or an infra-red carbonyl content (also measured and described below) of from 0.005 to 0.03 carbonyl absorbance per mil by reacting the olefin polymer with a polymethylolated phenolic material, organic material containing one or more phenolic nuclei and having substituted directly on the phenolic nuclei at least two methylol groups (—CH$_2$OH) on the average.

It has further been discovered that the joint use of critical amounts of an organic peroxide with a polymethylolated phenolic material containing one or more phenolic nuclei and having substituted directly on the phenolic nuclei at least two methylol groups (—CH$_2$OH) on the average results in a synergistic improvement in adhesional properties in both virgin and oxidized olefin polymers and also improves physical properties, particulrarly solvent resistance.

It has further been discovered that these improved physical properties and marked adhesional properties are imparted to hydroxyl (—OH) and/or carboxyl containing polymers by reacting with a polymethylolated phenolic material.

Important and advantageous modifications of olefin polymers can be achieved by the use of non-free-radical crosslinking agents, namely polymethylolated phenolic materials which have heretofore been achieved only by the use of free-radical type crosslinking agents, e.g., peroxides. Moreover, the use of polymethylolated phenolic materials as crosslinking agents pose none of the problems associated with peroxide crosslinking agents used alone.

A highly surprising and unexpected property of the polymethylolated phenolic material reacted ethylene polymers of this invention is their marked adhesional properties. These ethylene polymers applied as liquid for coating or as film for surfacing various substrates or as laminate interlayers exhibit tenacious adhesion to fibrous, non-fibrous, porous, and nonporous, flexible and rigid metallic, nonmetallic, polymeric, cellulosic and glass surfaces.

In general, the method of this invention requires for imparting adhesional characteristics to ethylene polymers mixing to substantial homogeneity the ethylene polymer and the polymethylolated phenolic material and modifying the ethylene polymer by reacting the methylol groups of the polymethylolated phenolic material with the ethylene polymer.

In order to modify olefinic hydrocarbon polymers in molecular weight, thermal deformation temperature characteristics, improved clarity and enhanced solvent resistance, it is essential in the method of this invention to mix to substantial homogeneity such an olefin polymer with the above peroxide and carbonyl characteristics and the polymethylolated phenolic material and crosslink the olefin polymer by reacting the methylol groups of the polymethylolated phenolic material with the olefin polymer.

The above peroxide and carbonyl values cannot be obtained without deliberate oxidation.

The particular means of achieving oxidation of the olefin polymer is not narrowly critical. Broadly, intimately contacting the olefin polymer with an oxygen containing environment such as air, oxygen, ozone, various catalytic agents, or chemical reagents for a sufficient length of time will result in the oxidation production of certain methylol reactive groups. Among these groups are carboxyl, hydroxyl, hydroperoxide and hydrogen groups. Levels of peroxide and/or carbonyl within the above limits are indicative of the presence of suitable amounts of these oxidation produced groups.

A suitable means of producing these groups in olefin polymers is to bubble ozone, or oxygen or a mixture thereof, e.g., 2% ozone in oxygen, through a heated bed, e.g., to 60° C. of powdered, e.g., 20 mesh, virgin ethylene polymer for a sufficient time, e.g., for 60 minutes.

This treatment of a virgin ethylene homopolymer which normally has a carbonyl absorbance per mil of 0.0002 and a peroxide content of 0.04 milligram per gram resin results in an oxidized ethylene polymer increased in carbonyl absorbance to 0.003 per mil resin and peroxide content to 1.4 milligrams per gram resin. Also suitable is treating virgin olefin polymer with an oxidizing chemical reagent, e.g., by slurrying powdered resin in heated chromic acid (sulfuric acid-potassium dichromate) for about 30 minutes. The resin should be washed with water afterwards to remove acid and dichromate. This treatment of virgin ethylene homopolymer causes an increase in carbonyl absorbance per mil to 0.005 and in peroxide content to 1.9 milligrams per gram resin.

Still another suitable method of controllably oxidizing olefin polymers is milling the polymer in air or oxygen containing atmosphere at elevated temperatures, e.g., above 110° C. for a sufficient period, e.g., 45 minutes. This treatment of ethylene homopolymer causes an increase in carbonyl absorbance to 0.007 per mil and in peroxide content to 1.9 milligrams peroxide per gram resin. Other oxidizing means include agitation in suitably atmospherically controlled apparatus other than roll mills. Oxidation can also be effected by sparging oxygen, air or ozone into a solution of the ethylene polymer.

From the foregoing illustrative means for oxidizing the olefin polymers, it can be seen that in any method wherein heat and oxygen are mutually present with an olefin polymer under condtions insuring a good degree of contact between the polymer and the oxygen, oxidation will take place. It is of course also required that the contacting be carried out for a time sufficient to build up carbonyl absorbance and peroxide content levels to the above set forth minimal values.

By the term "virgin olefin polymers" is meant those olefin polymers which have not been subjected to deliberate oxidation by mechanical working, solvating or chemical reaction in an oxidizing atmosphere. As pointed out above, the oxidation levels needed in the olefin polymers for molecular weight, solvent resistance, clarity and thermal deformation improvement are not present in virgin olefin polymers. Reaction of virgin olefin polymers which have less than these oxidation levels with polymethylolated phenolic material does not provide to a significant extent the foregoing improvements but does impart to ethylene polymers adhesional properties. In the absence of deliberate oxidation the oxidation levels of olefin polymers are substantially as shown in Table I in which all percentages are by weight and in which the carbonyl absorbance and peroxide content were determined as hereinafter set forth.

It is to be pointed out that hydroxyl (—OH) and carboxyl (—COOH) containing polymers by virtue of having these substituents do not require oxidation to the prescribed levels of peroxide content and/or carboxyl absorbance in contradistinction to polymers and copolymers of nonalcoholic and/or noncarboxylated olefins.

TABLE I

| Olefin Polymer | Carbonyl Absorbance per mil* | Peroxide Content, mg./gm. resin |
| --- | --- | --- |
| Ethylene homopolymer: | | |
| (0.92 density) | 0.0002 | 0.04 |
| (0.945 density) | 0.0002 | 0.02 |
| Ethylene/carbon monoxide (94%/6%) | | 0.06 |
| Ethylene/propylene (48%/52%) | | 0.035 |
| Ethylene/propylene (89%/11%) | | 0.045 |
| Ethylene/ethyl acrylate (79%/21%) | | 0.024 |
| Ethylene/ethyl acrylate (94%/6%) | | 0.05 |
| Ethylene/vinyl acetate (5.6 mole percent vinyl acetate in feed) | | 0.05 |
| Propylene | 0.0002 | 0.04 |

*Because ethylene copolymers may contain bands in the infrared which interfere with the carbonyl band, 5.8–5.85, meaningful infrared data must be in comparison with another sample of the resin, e.g. oxidized vs. virgin (differential carbonyl absorbance). Hence carbonyl values in this table are given only for ethylene homopolymers which are devoid of carbonyl or other interfering bands and hence give absolute carbonyl absorbance values.

Preferred for oxidizing the olefin polymers are mechanical mixing apparatus open to the air such as two roll mills and closed intermeshing gear type apparatus provided with oxygen or air atmosphere. These apparatus especially when heated to between 110° C. to 170° C., depending upon the oxidation susceptibility of the polymer, easily bring olefin polymers above (1) the minimum peroxide content of 0.15 milligram peroxide per gram resin and into the preferred peroxide content range of from 0.60 to 2.7 milligrams peroxide per gram resin; and (2) above the minimum differential carbonyl absorbance of 0.0005 per mil resin to within preferred range of 0.001 and above carbonyl absorbance per mil resin. Differential carbonyl absorbance per mil in the case of ethylene homopolymer is equal to the absolute carbonyl absorbance due to the absence of interfering bands in that polymer; with certain ethylene copolymers, however, the differential carbonyl absorbance represents only the relative amounts of carbonyl before and after the oxidation described above.

An advantage of mechanical mixing apparatus is that the polymethylolated phenolic material reactant can be blended in with the resin or just subsequently thereto without the need of further handling of the oxidized polymer. For example, an ethylene polymer can be oxidized by milling 45 minutes at 170° C. in air and the polymethylolated phenolic material blended in by fluxing the polymer at 110° C. adding the polymethylolated phenolic material and milling for about 5 minutes or until the additive is uniformly dispersed. In addition to the polymethylolated phenolic material, there can be incorporated at this point conventional additives, e.g., fillers such as carbon blacks and clays, pigments, catalysts for the methylol reaction, and the like. Other means for incorporating the various additives and crosslinking agents can be employed. The latter can be added during or after oxidation of the olefin polymers.

As stated above, it is not necessary to oxidize ethylene polymers i.e., polymers containing at least 50% combined ethylene prior to reaction with the polymethylolated phenolic materials in order to impart great adhesionability to the ethylene polymer. There is an advantage, however, to pre-oxidizing the ethylene polymer prior to reaction with the polymethylolated phenolic material because the resulting adherent polymer is then also improved in other properties which can be useful in a coating or bonding material as described above.

The virgin and oxidized olefin polymers are modified in the practice of this invention with polymethylolated phenolic materials by which term is meant to be included organic materials containing one or more phenolic nuclei and which are substituted, on the phenolic nuclei, with at least two methylol groups, on the average, i.e., organic materials containing a plurality of phenolic nuclei-attached methylol groups. Thus the term includes di- and tri-methylol substituted phenols and their alkali metal and alkaline earth metal salts, e.g., polymethylol calcium phenates and dimethylol-substituted alkyl phenols, e.g., dimethylol substituted cresols, xylenols, guiacol, 4-ethyl-resorcinol, 5-methylresorcinol, 4-propylresorcinol, carvacrol, methylphenol, e.g., dimethylol-p-methylphenol, ethylphenol, butylphenols, e.g., dimethylol-p-tert-butyl-phenol, octylphenol, dodecylphenol, eicrosylphenol, tricontylphenol, and tetracontylphenol, 2,3-dimethylphenol, 2,4-dimethylphenol, 2-ethyl-4-propylphenol, 2,5-dimethylphenol, 2-ethyl - 4 - methylphenol, 2,4-diethylphenol, 2-methyl-4-butylphenol, 2-ethyl-5-methylphenol, 2-methyl-5-isopropylphenol, 2-propyl-5-methylphenol, 2- isopropyl-5-methylphenol, 2,6-dimethylphenol, 2-methyl-6-ethyl-phenol, 2,6-diethylphenol, 2-methyl-6-propylphenol, 3,4-dimethylphenol, 3-methyl - 4 - ethylphenol, 3,5-dimethylphenol, 3,5-diethylphenol, 2-chloro-4-methylphenol, 2-ethyl-4-chlorophenol, 3-chloro-4-methylphenol and other halogenated and/or higher alkylphenols.

Also included are polymethylol derivatives of bisphenol sulfones wherein the phenolic nuclei are selected from the phenols given above as well as the monomethylol derivatives of the phenols mentioned. It is to be noted that only one of the phenolic nuclei of the bisphenol sulfones need contain two or more methylol groups or each phenolic nucleus can contain one methylol group. What is required is two or more phenol-attached methylol groups; their distribution on the molecule is not critical.

Also included in the term polymethylolated phenolic materials are the resole resins, condensation reaction products of from amount 0.75 to about 1.4 moles of a phenol such as one of those listed above especially p-tert-butyl phenol, p-tert-octyl phenol and p-tert nonyl phenol per mole of formaldehyde in the presence of from 2 to 6 percent by weight based on the phenol of an alkaline catalyst such as ammonia, hexamethylene tetramine or sodium carbonate.

Preferred as the polymethylolated phenolic material in this invention are the (a) resole resins prepared from formaldehyde and branched lower alkyl group substituted phenols, e.g., p-tert-butyl phenol, or p-tert-octyl phenol or p-tert-nonyl phenol, (b) 2,4,6-tris(hydroxymethyl) phenol (elsewhere herein referred to as 2,4,6-trimethylol-phenol) having the formula

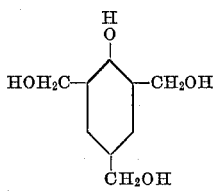

and the alkali and alkaline earth metal salts thereof, especially 2,4,6-tris(hydroxymethyl) calcium phenates, (c) dimethylol substituted alkylphenols such as dimethylol p-tert-butylphenol and dimethylol p-methylphenol, and (d) the bis, tris, and tetrakis methylol derivatives of 4,4'-bis(hydroxyphenyl)sulfone.

The use of polymethylolated phenolic materials with virgin and oxidized olefin polymers in virtually any concentration is productive of crosslinking and a generally favorable modification of polymer properties. The concentration of polymethylolated phenolic materials should not exceed, however, 40 percent by weight based on the oxidized olefin polymer as olefin polymer properties are lost to the composition. Conversely use of less than about 0.25 percent by weight of the modifying agent polymethylolated phenolic materials based on oxidized olefin polymer confers only negligible alteration of the olefin polymers. Above 0.25 percent by weight and particularly above about 0.5 percent part by weight of modifying agent based on the oxidized olefin polymer imparts significant property improvement. The improvement in olefin polymer properties from about 0.5 to about 20 percent by weight of polymethylolated phenolic material based on the oxidized olefin polymer is not proportionately increased by further increasing the modifying agent concentration to between 20 and 40 percent by weight. Hence, concentrations of polymethylolated phenolic material between 0.5 and 20 percent by weight are preferred. A particularly desirable balance of improved olefin polymer properties are achieved by the use of from about 3 to about 10% of a polymethylolated phenolic material having two methylol groups and 1 to 6% of a polymethylolated phenolic material having three or more methylol groups based on the oxidized olefin polymer and, hence, this concentration of these crosslinking agents is particularly preferred.

By the term "polymethylolated phenolic material" mixtures of two or more such materials are also meant to be included.

Among the modifications of olefin polymers caused by oxidation and crosslinking with polymethylolated phenolic materials in accordance with this invention, one of the most important is an increase in the gel content of the polymer. This property is a measure of the resistance to swelling of the olefin polymer when in contact with solvents; and resistance to swelling is an index to solvent resistance. Thus, as percent gel increases, solvent resistance increases. The gel content is an index to other properties of the crosslinked olefin polymers also. For example, resins having greater than about 10% gel content can be improved in clarity over uncrosslinked olefin polymer, hence this amount of gel is highly desirable. For most end-use applications a greater solvent resistance and higher molecular weight is desirable and the olefin polymer should have at least 15% gel content. Also, higher gel content generally means greater stress crack resistance. On the other hand, the adhesional characteristics of the polymers of this invention are apparent in resins containing no measurable gel content, i.e., 0% gel, and this property improves with increasing gel content.

The amount of gel formation is closely related to the degree of oxidation. For example, gel appears only when a resin having a carbonyl absorbance per mil of about 0.0005 is reacted with a polymethylolated phenolic material; a doubling of carbonyl absorbance to 0.001 results in a sextupling of per cent gel formation.

The practice of the present invention is illustrated by the following examples wherein all parts and percentages are by weight unless otherwise specified.

Percent gel was determined by immersing a 0.3 gram piece of a 20 mil, cured, crosslinked plaque of ethylene polymer enclosed in a 100 mesh copper wire cage, in refluxing ethylbenzene for 16 hours. The cage and contents after this period were dried at 110° C. for 3 hours. The weight of the resin in the cage divided by 0.3 and multiplied by 100 was the percent gel.

Clarity was empirically determined by looking through a 20 mil plaque.

Melt flow was determined according to ASTM D–1238–57T. As provided therein, 1P melt flow refers to the decigrams of resin extruded in one minute through a standard orifice at 190° C. and 44 pounds per square inch pressure; 10P melt flow is the value found at 190° C. and 440 pounds per square inch pressure.

Carbonyl absorbance per mil was determined by infra red techniques using a 20 mil plaque. Measurements were made at 5.84 microns and absorbance per mil calculated according to the equation:

$$\text{absorbance/mil} = \frac{\log \frac{I_0}{I}}{t}$$

where $t$ = thickness in mils
$I_0$ = incident radiation, percent transmission
$I$ = transmitted radiation, percent transmission Apparatus used was a Perkin-Elmer Model 21 double beam infra red spectrophotometer.

The carbonyl absorbance per mil of all ethylene polymers except ethylene homopolymers was measured as differential absorbance by placing an equally thick sample of virgin resin into the reference beam while the oxidized polymer sample was in the sample beam. Thus, the carbonyl measured was that formed by the oxidation step.

Peroxide content was determined by weighing 0.500±0.001 gram of finely divided polyethylene (powdered to 20 mesh) into an 8 by 1 inch pressure tube; pipetting 25 ml. of alcohol-stabilized tetrachloroethylene into a 50 ml. graduate and adding 7 ml. of a one percent solution of sodium iodide in methanol. This was mixed and added to the resin in the pressure tube which was then capped. Heat at 130° C. was applied for five minutes. The tubes were removed and cooled in dry ice for three minutes. Five milliliters of the methanol-iodine layer was pipetted off. The transmission was measured in a Beckman DU Spectrophotometer at 450 and 600 m$\mu$ using the methanol-iodide solution as a blank.

The sodium iodide in methanol was made up as follows: 1.00 gram of sodium iodide was dissolved in 100 grams (125 cc.) of distilled methanol which had been made acid by addition of a drop of phosphoric acid.

Peroxide content was then calculated from the formula:

$\frac{A}{B} \times 100$ = corrected percent transmission at 450 m$\mu$ $A$ = percent transmission at 450 m$\mu$
$B$ = percent transmission at 600 m$\mu$

TABLE II.—VARIATION OF LIGHT TRANSMISSION WITH PEROXIDE CONTENT IN POLYETHYLENE

| Milligrams Peroxidic Oxygen/gram resin | Log of percent light Transmission (450 m$\mu$, 10 mm. Light Path) |
|---|---|
| 0.05 | 67 |
| 0.1 | 44.5 |
| 0.15 | 29.5 |
| 0.2 | 19.5 |
| 0.25 | 15.0 |

Using the corrected transmission from the above table for the milligrams of peroxidic oxygen per gram resin, the peroxide content is calculated from the equation:

$\frac{M}{S}$ = peroxidic oxygen, mg. per gm. resin $M$ = mg. peroxidic oxygen from chart
$S$ = sample weight Stress cracking resistance was measured as follows:

A compression molded and cured polymer specimen 0.5 inch wide by 1.5 inches long and 125 mils thick was slit 20 mils deep along its length for 75 mils. The specimen was bent 180° and with 9 similar samples in a channel holder immersed in a non-ionic surfactant, nonyl phenoxy polyoxyethylene ethanol, at 50° C. Usually two channel holders were used, providing 20 specimens per test. Failure of a specimen was the appearance of a crack perpendicular to the slit. $F_{50}$ is time of failure of 10 samples of the 20 (i.e., 50% failure).

*Example 1*

A high pressure process ethylene homopolymer having a density of 0.92, zero gel content, a 1P melt flow of 1.7, dg./min. a carbonyl absorbance per mil of 0.0002 and a peroxide content of 0.04 milligram/gram resin was milled in air for 45 minutes at 170° C. to provide a differential carbonyl absorbance per mil of 0.008 and a peroxide content of 1.9 milligrams/gram resin. The oxidized polyethylene was milled on a two-roll mill at 110° C. and, immediately after fluxing, 3% 2,4,6-trimethylolphenol (TMP) was incorporated into the polyethylene. The modified polymer was sheeted, ground, and compression molded into 20 mil plaques and cured at 150° C. for 60 minutes.

Percent gel of the cured, crosslinked product was 20% and 1P melt flow was zero decigram/minute. Stress cracking resistance was improved greatly to 450 hours from 35 hours for the unoxidized non-crosslinked control resin.

*Examples 2–6*

The procedure of Example 1 was followed but using in place of the 0.92 density ethylene homopolymer the following:

Example 2 — 0.045 density polyethylene (low pressure process).
Example 3a — 0.930 density ethylene/6% ethyl acrylate copolymer (high pressure process).
Example 3b — Ethylene/21% ethyl acrylate copolymer (high pressure process).
Example 4 — 0.945 density ethylene/carbon monoxide copolymer (1.27 mole percent CO in the feed; high pressure process).
Example 5a — Ethylene/52% propylene copolymer (low pressure process).
Example 5b — Ethylene/11% propylene copolymer (low pressure process).
Example 6 — Ethylene/vinyl acetate copolymer (5.76 mole percent vinyl acetate in the feed; high pressure process.)

Results of the above examples are presented in Table III. Data on these ethylene polymers milled with 3% 2,4,6-tris(hydroxymethyl)phenol as in Example 1 but without oxidation beforehand are included for comparison.

TABLE III.—PHYSICAL PROPERTIES OF ETHYLENE POLYMERS (1) OXIDIZED (2) UNOXIDIZED MILLED WITH 3% 2,4,6-TRIS(HYDROXYMETHYL)PHENOL)

| Ex. | Ethylene Polymer | Differential Carbonyl Absorbance per mil | Oxidized | | | Unoxidized | | | |
|---|---|---|---|---|---|---|---|---|---|
| | | | Peroxide, mg./gm. resin | Gel Content, percent | 1P melt flow, dg./min. | Carbonyl absorbance per mil | Peroxide, mg./gm. resin | Gel content, percent | 1P melt flow, dg./min. |
| 1 | Low density polyethylene 1.7 1P melt flow (dg./min.). | 0.008 | 1.9 | 20 | 0 | 0.0002 | 0.04 | 0 | 1.7 |
| 2 | High density polyethylene 1.0 1P melt flow (dg./min.). | 0.006 | 1.6 | 16 | 0.03 | 0.0002 | 0.02 | 0 | 1.0 |
| 3a | Ethylene/6% ethyl acrylate 4.9 1P melt flow (dg./min.). | 0.006 | 1.4 | 15 | 0.1 | | 0.05 | 0 | 4.9 |
| 3b | Ethylene/21% ethyl acrylate 5.6 1P melt flow (dg./min.). | 0.007 | 1.4 | 21 | 0.2 | | 0.024 | 2 | 18 |
| 4 | Ethylene/carbon monoxide 5.8 1P melt flow (dg./min.). | 0.012 | 2.7 | 25 | 0.06 | | 0.06 | 1 | 5 |
| 5a | Ethylene/52% propylene 0.5 1P melt flow (dg./min.). | 0.004 | 1.5 | 16 | 0.01 | | 0.035 | 2 | 0.2 |
| 5b | Ethylene/11% propylene 1 1P melt flow (dg./min.). | 0.008 | 1.8 | 13 | 0.1 | | 0.045 | | |
| 6 | Ethylene/vinyl acetate 7.2 1P melt flow (dg./min.). | 0.007 | 1.3 | 17 | 0 | | 0.05 | 0 | 7.2 |

Examples 7-19

The precedure and ethylene polymers of Examples 1-6 were used employing as the crosslinking agent:

For Example 7........ A p-tert-butylphenol/formaldehyde reaction product (TBPF) prepared by reacting from 0.75 to 1.4 moles of p-tert-butylphenol per mole of formaldehyde in the presence of from 2 to 6% by weight hexamethylene tetramine;

For Examples 8-13.... A p-tert-octylphenyl/formaldehyde reaction product (TOPF) prepared as was the resin in Example 7 but substituting the octylphenol for butylphenol;

For Examples 14-15... A p-tert-nonylphenol/formaldehyde reaction product (TOPF) prepared as was the resin in Example 7 but substituting the nonylphenol for butylphenol;

For Example 16....... A polymethylolated bisphenol sulfone (TMBS) prepared by methylolating a commercial grade bisphenol sulfone predominantly the 4,4′ isomer by reaction with formaldehyde. The resulting three methylol groups per molecule;

For Example 17....... 2,4,6-tris (hydroxymethyl) calcium phenate (CaTMP);

For Example 18....... Dimethylol-p-tert-butylphenol (DMBP);

For Example 19....... Dimethylol-p-tert-methylphenol (DMMP).

Results of crosslinking various ethylene polymers with these polymethylolated phenolic materials are given below in Table IV (Examples 7-12) and in Table V (Examples 13-19).

Example 20.—Effect of extent of pre-oxidation

Portions of an ethylene homopolymer having a 1P melt flow of 2.0 and a density of 0.92 were oxidized by milling in air for different length of time on a two roll mill at 170° C. and thereafter milled, after fluxing, with 10% 2,4,6-trimethylolphenol (TMP) and cured for 60 minutes at 150° C. The results of different oxidation times are given in Table VI below.

TABLE VI.—OXIDIZED POLYETHYLENE CROSSLINKED WITH TMP

| Example | Milling time at 170° C. (minutes) | Peroxide, mg./gm. resin | Absolute Carbonyl Absorbance per mil | 10P melt flow | Gel Percent |
|---|---|---|---|---|---|
|  | None | 0.04 | 0.0002 | 140 | 0 |
| 20a | 10 | 0.15 | 0.0005 | <130 | >0.5 |
| 20b | 20 | 0.62 | 0.001 | <90 | >4 |
| 20c | 30 | 1.3 | 0.002 | <60 | >10 |
| 20d | 40 | 1.9 | 0.008 | <37 | >27 |
| 20e | 45 | 2.1 | 0.012 | <28 | >33 |
| 20f | 70 | 3.8 | 0.032 | <5 | >42 |

TABLE IV.—PHYSICAL PROPERTIES OF ETHYLENE POLYMERS (1) OXIDIZED (2) UNOXIDIZED MILLED WITH 3% TBPF, TOPF

| Ex. | Ethylene Polymer | Differential Carbonyl Absorbance per mil | Oxidized | | | Unoxidized | | | |
|---|---|---|---|---|---|---|---|---|---|
| | | | Peroxide, mg./gm. resin | Gel Content, percent | 1P melt flow, dg./min. | Carbonyl absorbance per mil | Peroxide, mg./gm. resin | Gel content, percent | 1P melt flow, dg./min. |
| 7 | Low density polyethylene 1.7, 1P melt flow (dg./min.)+TBPF. | 0.008 | 1.9 | 15 | 0.04 | 0.0002 | 0.04 | 0 | 1.7 |
| 8 | High density polyethylene 1.0 1P melt flow (dg./min.)+TOPF. | 0.006 | 1.6 | 13 | 0.2 | 0.0002 | 0.02 | 0 | 1.0 |
| 9a | Ethylene/6% ethyl acrylate 4.9 1P melt flow (dg./min.)+TOPF. | 0.006 | 1.4 | 8 | 0.05 | | 0.05 | 0 | 4.9 |
| 10 | Ethylene/carbon monoxide 5.8 1P melt flow (dg./min.)+TOPF. | 0.012 | 2.7 | 28 | 0 | | 0.06 | 5 | 0.05 |
| 11 | Ethylene/52% propylene 0.5 1P melt flow (dg./min.)+TOPF. | 0.004 | 1.5 | 15 | 0.05 | | 0.035 | 1 | 0.3 |
| 12 | Ethylene/vinyl acetate 7.2 1P melt flow (dg./min.)+TOPF. | 0.007 | 1.3 | 10 | 0 | | 0.05 | 0 | 7.2 |

TABLE V.—PHYSICAL PROPERTIES OF ETHYLENE POLYMERS (1) OXIDIZED (2) UNOXIDIZED MILLED WITH 3% TBPF, TNPF, TMBS, CaTMP, DMBP, DMMP

| Ex. | Ethylene Polymer | Differential Carbonyl Absorbance per mil | Oxidized | | | Unoxidized | | | |
|---|---|---|---|---|---|---|---|---|---|
| | | | Peroxide, mg./gm. resin | Gel Content, percent | 1P melt flow, dg./min. | Carbonyl absorbance per mil | Peroxide, mg./gm. resin | Gel content, percent | 1P melt flow dg./min. |
| 13 | Low density polyethylene 1.7 1P melt flow (dg./min.)+TBPF. | 0.008 | 1.9 | 12 | 0.03 | 0.0002 | 0.04 | 0 | 1.7 |
| 14 | Low density polyethylene 1.7 1P melt flow (dg./min.)+TNPF. | 0.008 | 1.9 | 10 | 0.5 | 0.0002 | 0.04 | 0 | 1.7 |
| 15 | Ethylene/carbon monoxide 5.8 1P melt flow (dg./min.)+TNPF. | 0.012 | 2.7 | 35 | 0 | | 0.06 | 6 | 0.1 |
| 16 | Low density polyethylene 1.7, 1P melt flow (dg./min.)+TMBS. | 0.008 | 1.9 | 37 | 0 | 0.0002 | 0.04 | 0 | 1.7 |
| 17 | Low density polyethylene 1.7, 1P melt flow (dg./min.)+CaTMP. | 0.008 | 1.9 | 12 | 0.04 | 0.0002 | 0.04 | 0 | 1.7 |
| 18 | Low density polyethylene 1.7, 1P melt flow (dg./min.)+DMBP. | 0.008 | 1.9 | 7 | 0.3 | 0.0002 | 0.04 | 0 | 1.7 |
| 19 | Low density polyethylene 1.7, 1P melt flow (dg./min.)+DMMP. | 0.008 | 1.9 | 9 | 0.1 | 0.0002 | 0.04 | 0 | 1.7 |

The difference in amount of crosslinking achieved by preoxidizing the ethylene polymers is clearly shown in the preceding tables by a comparison of the negligible melt flows in the preoxidized resins with the only slight difference in melt flow between the control polymers and the unoxidized polymers. All were virtually unchanged except the ethylene/21% ethyl acrylate copolymers where a small amount of the acrylate was hydrolyzed during manufacture to carboxyl and reacted during the tests.

Examples 21-24.—Effect of polymethylolated phenolic material concentration on the extent of crosslinking reaction Four portions of an ethylene homopolymer (PE) having a density of 0.92 and a melt flow of 2 were oxidized and milled with 0.5% (21a), 3% (21b), 10% (21c) and 30% (21d) of 2,4,6-tris(hydroxymethyl)phenol (TMP). Three portions of the ethylene/carbon monoxide copolymer of Example 4 (E/CO) were oxidized and milled with 1% (22a), 3% (22b) and 10% (22c) of 2,4,6-tris(hydroxymethyl)phenol (TMP). Three portions of the above ethylene polymer were oxidized and milled with 1% (23a), 3% (23b), and 10% (23c) of a resole resin prepared from p-tert-octylphenol and formaldehyde (TOPF). Three portions of the above ethylene/carbon monoxide copolymer were oxidized and milled with 1% (24a), 3% (24b) and 10% (24c) of a resole resin prepared from p-tert-nonylphenol and formaldehyde (TNPF). Each of these compositions was sheeted and ground and cured into plaques at 150° C. for 60 minutes. Results of melt flow and gel tests are given below in Table VII.

TABLE VII

| Example | Olefin Polymer | Polymethylolated Phenolic Material, percent | Peroxide, mg./gm. resin | Absolute Carbonyl absorbance, per mil | 10P melt flow | Gel percent |
|---|---|---|---|---|---|---|
|  | PE |  | 0.04 | 0.0002 | 140 | 0 |
| 21a | PE | TMP (0.5) | 2.1 | 0.01 | 97 | 4 |
| 21b | PE | TMP (3) | 2.1 | 0.01 | 1.9 | 20 |
| 21c | PE | TMP (10) | 2.1 | 0.01 | 0.5 | 31 |
| 21d | PE | TMP (30) | 2.1 | 0.01 | 0 | 46 |
| 23a | PE | TOPF (1) | 2.1 | 0.01 |  |  |
| 23b | PE | TOPF (3) | 2.1 | 0.01 | 5.9 | 15 |
| 23c | PE | TOPF (10) | 2.1 | 0.01 | 1.3 | 28 |
|  | E/CO |  | 0.06 |  | 320 | 0 |
| 22a | E/CO | TMP (1) | 1.7 | 0.006 |  |  |
| 22b | E/CO | TMP (3) | 1.7 | 0.006 | 45 | 25 |
| 22c | E/CO | TMP (10) | 1.7 | 0.006 | 5 | 37 |
| 24a | E/CO | TNPF (1) | 1.7 | 0.006 |  |  |
| 24b | E/CO | TNPF (3) | 1.7 | 0.006 | 53 | 35 |
| 24c | E/CO | TNPF (10) | 1.7 | 0.006 | 10 | 40 |

*Examples 25–26.—Effect of length of cure on Extent of crosslinking*

Ethylene homopolymer (PE) having a density of 0.92 and a melt index of 2 was oxidized and milled with 3% of 2,4,6-tris(hydroxymethyl)phenol (TMP). The resin was sheeted and ground and molded into plaques at 165° C. for 7 minutes (25a) and 30 minutes (25b). The ethylene/carbon monoxide copolymer of Example 4 (E/CO) was oxidized and milled with 3% of a resole resin prepared from p-tert-nonylphenol and formaldehyde (TNPF). The resin was sheeted and ground and molded into plaques at 150° C. for 10 minutes (26a) and 60 minutes (26b). Results of melt flow and gel tests are given in Table VIII below.

TABLE VIII

| Ex. | Ethylene Polymer | Polymethylolated Phenolic Compound | Peroxide, mg./gm. resin | Carbonyl per mil | Cure Time/Temp. (min.) (° C.) | Gel Percent | 10P Melt Flow |
|---|---|---|---|---|---|---|---|
|  | PE |  | 0.04 | 0.0002 |  | 0 | 140 |
| 25a | PE | TMP | 2.4 | 0.014 | 7/165 | 3 | 107 |
| 25b | PE | TMP | 2.4 | 0.014 | 30/165 | 10 | 49 |
|  | E/CO |  | 0.07 |  |  | 0 | 320 |
| 26a | E/CO | TNPF | 2.7 | 0.012 | 10/150 | 30 | 53 |
| 26b | E/CO | TNPF | 2.7 | 0.012 | 60/150 | 38 | 14 |

*Examples 27–30.—Improvement in adhesion properties of polyethylene by reacting with polymethylolated phenolic materials with or without oxidation*

Ethylene homopolymer having a density of 0.92 and a melt index of 2 was oxidized, and milled with 6% and/or 0.5% of one of several polymethylolated phenolic materials. A 10 mil film was removed from the rolls and placed between a 20 mil thick sheet of polyethylene film and a solvent washed, cold rolled steel panel. The assembly was placed between cellophane wrapped polished platens and cured under 500 pounds/sq. in. at 170° C. for 10 minutes pressure in a standard hydraulic steam heated press.

The peel adhesion of the polyethylene film sheet to the substrate was measured according to ASTM D–903 on a Scott tensile tester in the following manner:

A one inch wide strip was cut across the polyethylene and down to the substrate. The strip was then peeled from the substrate at a constant rate of one inch/minute and the force required measured in pounds/inch.

Results with the following polymethylolated phenolic materials are given in Table IX below.

Example 27a ............ 2,4,6-tris(hydroxymethyl) phenol (TMP) at 0.5%.

Example 27b ............ 2,4,6-tris(hydroxymethyl) phenol (TMP) at 6%.

Example 28a ............ 2,4,6-tris(hydroxymethyl) calcium phenate (CaTMP) at 0.5%.

Example 28b ............ 2,4,6-tris(hydroxymethyl) calcium phenate at 6%.

Example 29 ............ Dimethylol bisphenol sulfone (DMBS) at 0.5%.

Example 30 ............ Resole resin prepared from p-tert-octyl phenol and formaldehyde (TOPF).

TABLE IX.—ETHYLENE HOMOPOLYMER AND POLYMETHYLOLATED PHENOLIC MATERIALS

| Example | Peroxide, mg./gm. | | Peel Strength | |
|---|---|---|---|---|
|  | Carbonyl Absorbance/mil | | Unoxidized | Oxidized |
|  |  |  | 0.04 | 1.9 |
|  |  |  | 0.002 | 0.007 |
|  | Polymethylolated Phenolic Material | Percent |  |  |
| 27a | TMP |  | <1 | 2–3 |
| 27b | TMP | 6 | 28–30 | 22 |
| 28a | CaTMP | 0.5 | <1 | >40 |
| 28b | CaTMP | 6 |  | 12 |
| 29 | DMBS | 0.5 |  | 35–40 |
| 30 | TOPF | 6 | 4–5 | 7 |
|  |  |  |  | 11 |

As broadly pointed out above olefin polymers containing carboxyl (—COOH) groups in their structures are crosslinked to advantage by polymethylolated phenolic materials. The term "carboxyl group" is intended to embrace an anhydride group. Specifically, improvements are obtained in such olefin polymers which contain at least 50 percent by weight of a combined alpha monoethylenically unsaturated hydrocarbon having from 2 to 4 carbon atoms, inclusive, preferably ethylene and up to 50 percent by weight of one or two monomers copolymerizable with ethylene and which contain a carboxyl group. These olefin polymers suitably have a melt index (ASTM 1238–57T) in the range of 0 to 1000 and preferably in the range of 0.02 to 100 decigrams/minute. Examples of these olefin polymers, illustrative of the class are: ethylene/acrylic acid copolymers; ethylene/methacrylic acid coplymers; ethylene/monobutyl maleate copolymers; ethylene/bicyclo-(2,2,1)-hept-2-ene-5-carboxylic acid copolymers; polyethylene/maleic anhydride graft copolymer; especially containing about 0.5 percent by weight carboxyl groups (calculated as maleic anhydride); ethylene/ethyl acrylate/acrylic acid terpolymers; and ethylene/vinyl acetate/acrylic acid terpolymers, all containing a minimum of 50 percent combined ethylene, propylene or butene-1. These carboxyl containing olefin polymers contain from 1 to about 15 percent by weight carboxyl groups and preferably from 1 to 10 percent by weight carboxyl groups.

The improvements obtained in these olefin polymers by modification with polymethylolated phenolic materials are in many respects similar to improvements obtained in the hereinabove described olefin polymers, e.g., increased adhesionability, improved solvent resistance and clarity, excellent stress crack resistance, increased molecular weight, improved tensile properties and impact strength.

The foremost advantages of the carboxyl containing olefin polymers crosslinked with polymethylolated phenolic materials are first a great variability in the modulus (stiffness) of the resulting material depending on reactants and reaction conditions. Whereas olefin polymers without carboxyl groups when crosslinked with these materials retain substantially their modulus, e.g., 15,000–140,000 p.s.i. the carboxyl containing olefin polymers when crosslinked with polymethylolated phenolic materials can vary from as low as 500 p.s.i. to as high as 150,000 p.s.i. in modulus with products under 2000 p.s.i. modulus being elastomeric in nature. The second great advantage is the improved tensile strength both at room temperature, i.e., 23° C. and at elevated temperatures, e.g., 100° C.

In the carboxyl containing olefin polymer compositions now being described the concentration of polymethylolated phenolic materials is suitably within the limits set out above and is preferably in the range of 0.2 to 25 parts, particularly from 0.5 to 15 parts of the polymethylolated phenolic material per 100 parts of the carboxyl containing olefin polymer.

In the following examples the carboxyl containing olefin polymer was fluxed on a two roll mill at about 120° C. and the polymethylolated phenolic material was then milled in for about 10 minutes, including ten end passes to assure complete dispersion of the additive. Compression molded plaques (20 mils thick unless otherwise noted) were prepared by curing at a temperature and for a time indicated in each example.

The various carboxyl containing olefin polymers were prepared either by directly polymerizing ethylene with carboxyl group containing monomers, such as acrylic acid, methacrylic acid, monobutyl maleate, or bicycloheptene carboxylic acid or by complete or partial hydrolysis of a copolymer of ethylene and the ester analog of the desired acid, e.g., ethylene/ethyl acrylate copolymer hydrolyzed to make an ethylene/acrylic acid copolymer. Terpolymers are prepared by either polymerizing ethylene and, e.g., acrylic acid with a third monomer, e.g., an ester such as ethyl acrylate or vinyl acetate, or by only partially hydrolyzing ethylene/and e.g. ethyl acrylate copolymer.

Test procedures not previously identified were:

*Flow index.*—ASTM D–1238–57T at 440 p.s.i.

*Tensile impact.*—A dumbbell specimen ⅜" x 2½" is mounted in a Izod Impact Tester so that a high rate of loading is applied parallel to the long direction of the specimen. Results are reported as modulus of toughness. Units are ft.-lbs./cu. in. of specimen.

*Tensile strength.*—ASTM–D–412–51T, except 1"/minute up to yield, thereafter to break 20"/minute.

*Modulus (secant modulus of elasticity).*—ASTM–D–638–58T, except 4" gripping surfaces, speed B and die A of ASTM–D–412–51T.

*Chemical resistance.*—Pieces about 2" x 2" x 20 mils placed in various solvents for one week. Percent gain in weight is determined.

*Brittleness temperature.*—ASTM–D–1003–52.

*Durometer hardess.*—ASTM–D–676–55T – "A" and ASTM–D–1484–57T–"D."

*Compression set.*—ASTM–D–395–55–Method B; 100° C., 70 hours.

*Tension set.*—A 5" x ⅛" x 20 mil specimen stretched 200%, held one minute, then released. Set is recovery of original length after 10 minute relaxation.

*Example 31*

An ethylene/acrylic acid copolymer containing 4.3 percent acrylic acid is modified with 8 percent 2,4,6-trimethylolphenol. Cure is at 180° C. for 15 minutes. Melt index is reduced to 0, flow index is greatly lowered and gel substantially increased.

*Example 32*

Example 31 is duplicated but using an ethylene/monobutylmaleate copolymer containing 11.1% monobutylmaleate. Cure is at 150° C. for 30 minutes. Similar improvements are obtained.

*Example 33*

An ethylene/ethyl acrylate/acrylic acid terpolymer containing <1% ethyl acrylate and 3.5% acrylic acid was modified with 5% 2,4,6-trimethylolphenol. Cure was at 160° C. for 15 minutes. Properties were:

|  | Before | After |
|---|---|---|
| Melt Index | ~1 | Not extrudable. |
| Flow Index | 8.2 | Do. |
| Percent Gel | 0 | >50. |

*Example 34*

Example 33 was duplicated substituting for the polymer an ethylene/ethyl acrylate/acrylic acid terpolymer containing 11% ethyl acrylate and 4.2% acrylic acid and 10% nonylphenol/formaldehyde resole resin as the modifying agent. Cure was at 220° C. for 30 minutes. Properties were:

|  | Before | After |
|---|---|---|
| Melt Index | 1.6 | Not extrudable. |
| Flow Index | 98 | 0.36. |
| Percent Gel | 0 | 74. |

Example 35

Example 34 was duplicated substituting 8.4% dimethylol-t-butyl phenol as the modifying agent. Properties were:

|  | Before | After |
|---|---|---|
| Melt Index | 1.6 | Not extrudable. |
| Flow Index | 98 | 0. |
| Percent Gel | 0 | 52. |
| Tensile Impact | 550 | 800. |
| Tensile Strength at— |  |  |
| 23° C. (p.s.i.) | 2,300 | 2,740. |
| 100° C. (p.s.i.) | 0 | 220. |
| Tensile Elongation at 23° C | 650 | 360. |
| Modulus | 5,740 | 4,085. |

Example 36

Example 34 was duplicated substituting for the polymer an ethylene/ethyl acrylate/acrylic acid terpolymer containing 3 to 5% ethyl acrylate and 2.1% acrylic acid and using only 5.6% of the modifying agent. Properties were:

|  | Before | After |
|---|---|---|
| Melt Index | 3.5 |  |
| Flow Index | 156 | 0.3 |
| Percent Gel | 0 | 66 |
| Tensile Impact at 100° C. (p.s.i.) | 387 | 300 |
|  | 110 | 370 |
| Tensile Elongation at 23° C. (percent) | 450 | 265 |
| Modulus | 16,200 | 10,940 |

As further broadly pointed out above olefin polymers containing hydroxyl (—OH) groups in their structures are crosslinked to advantage by polymethylolated phenolic-materials. Specifically, improvements are obtained in such olefin polymers which contain at least 50 percent by weight of a combined alpha monoethylenically unsaturated hydrocarbon having from 2 to 4 carbon atoms, inclusive, preferably ethylene and up to 50 percent by weight of one or two monomers copolymerizable with ethylene and which contain an hydroxyl group. These olefin polymers suitably have a melt index (ASTM 1238–57T) in the range of 0 to 1000 and preferably in the range of 0.02 to 100 decigrams/minute. Examples of these olefin polymers, illustrative of the class are: ethylene/formaldehyde copolymers; hydrolyzed ethylene/vinyl formate copolymers; hydrolyzed ethylene/vinyl acetate copolymers; and terpolymers of similar comonomers, all containing a minimum of 50 percent combined ethylene, propylene or butene-1. These hydroxyl containing olefin polymers contain from 0.5 to 21 percent by weight hydroxyl groups and preferably from 1 to 10 percent by weight hydroxyl groups.

The improvements obtained in these olefin polymers by modification with polymethylolated phenolic materials are in many respects similar to improvements obtained in the hereinabove described olefin polymer, e.g., increased adhesionability, improved solvent resistance and clarity, excellent stress crack resistance, increased molecular weight, improved tensile properties and impact strength.

In the hydroxyl containing olefin polymer compositions now being described, the concentration of polymethylolated phenolic material is suitably within the limits set out above and is preferably in the range of 0.01 to 30 parts, particularly from 1 to 15 parts of the material per 100 parts of the hydroxyl containing olefin polymer.

In the following examples the hydroxyl containing olefin polymer was fluxed on a two-roll mill at about 110° C., except that olefin polymers containing 6 and 15 percent by weight hydroxyl groups were milled at 50° C. The polymethylolated phenolic material was milled in for about 10 minutes, including 10 end passes to assure complete dispersion of the additive. Compression molded plaques (20 mils thick) were prepared by curing at a temperature and for a time indicated in each example.

The various hydroxyl containing olefin polymers were prepared by directly polymerizing ethylene with an hydroxyl group containing monomer, such as formaldehyde or by complete or partial hydrolysis of a copolymer of ethylene and an ester, e.g., ethylene/vinyl acetate copolymer hydrolyzed or ethylene/vinyl formate copolymer hydrolyzed.

Example 37

An ethylene/vinyl formate copolymer having a melt index of 9.7 and a density of 0.950 was hydrolyzed to an hydroxyl content of 1.5 percent by weight and modified with 3 percent of p-tert butyl phenol/formaldehyde resole resin with 3 parts chlorosulfonated polyethylene catalyst per 100 parts of resin. Cure was at 150° C. for 60 minutes. Properties of the copolymer before and after modification were as follows:

|  | Before | After |
|---|---|---|
| Flow Index | 139 | 0.3 |
| Percent Gel | 0 | 21 |

Example 38

Example 37 was duplicated but using 3% of nonyl phenol/formaldehyde resole resin. Properties were:

|  | Before | After |
|---|---|---|
| Flow Index | 139 | 0.1 |
| Percent Gel | 0 | 28 |

Example 39

Example 35 was duplicated but using 3% of 2,4,6-trimethylolphenol and omitting the catalyst. Properties were:

|  | Before | After |
|---|---|---|
| Flow Index | 139 | 0 |
| Percent Gel | 0 | 46 |

Example 40

Example 39 was duplicated but using 13.2 of dimethylol-p-tert butyl phenol and an ethylene/vinyl formate copolymer hydrolyzed to an hydroxyl content of 2.2 percent by weight. Cure was at 160° C. for 30 minutes. Properties were:

|  | Before | After |
|---|---|---|
| Flow Index | 32 | 0 |
| Percent Gel | 0 | 60 |

Examples 41–45

Example 39 was duplicated but using various amounts of 2,4,6-trimethylolphenol TDI. Results are summarized in Table X.

TABLE X

| Example | Percent TMP* | Flow Index | | Percent Gel | |
|---|---|---|---|---|---|
|  |  | Before | After | Before | After |
| 41 | 0.1 | 139 | 90 | 0 | 1.5 |
| 42 | 0.5 | 139 | 1 | 0 | 17 |
| 43 | 3 | 139 | 0 | 0 | 46 |
| 44 | 10 | 139 | 0 | 0 | 77 |
| 45 | 20 | 139 | 0 | 0 | 83 |

*2,4 6-trimethylolphenol.

Example 46

Example 44 was duplicated but curing at 100° C. for 360 minutes. Flow index was reduced from 139 to 0; percent gel was 64%.

Example 47

Example 37 was duplicated but using an ethylene/ 10.1% vinyl acetate copolymer hydrolyzed to 2.1% hydroxyl content and 10% dimethylol-p-tert butyl phenol. Cure was at 180° C. for 30 minutes. Flow index was reduced from 298 to 0; percent gel was 70%; tensile impact was increased from 184 foot-lbs./cubic in. to 737 foot-lbs./cubic in.

Example 48

Example 43 was duplicated. Flow index was reduced from 139 to 0; percent gel was 46%; stress cracking resistance ($F_{50}$) was increased from 0.1 hour to 410 hours, and cloudiness was changed to clarity.

As indicated above a further aspect of the present invention is the improvement in physical properties of olefin polymers by the conjoint use of organic peroxides and polymethylolated phenolic materials, which improvements are not associated with drawbacks of peroxide crosslinking heretofore known in the art and above mentioned. Importantly, there is a synergistic improvement in the adhesional properties of olefin polymers using organic peroxides and polymethylolated phenolic materials together, over either used separately.

In the compositions now being described the use of relatively low amounts of polymethylolated phenolic material is quite possible and is in fact, preferred. In these compositions, from 0.25 to 40% by weight of the phenolic material is useful, but 0.25% to 10% by weight of thereof is ordinarily sufficient, and 0.5 to 6% is preferred, particularly 1 to 2% in combination with from 0.25% to 3%, preferably from 0.5 to 2% by weight of an organic peroxide.

The adhesional improvement is noted in both virgin and oxidized olefin polymers. Solvent resistance and tensile strength of olefin polymers as well as adhesion are improved when the polymers are oxidized to levels above described prior to reaction with polymethylolated phenolic material and the peroxide.

The ratio of polymethylolated phenolic material and peroxide is not critical in these compositions. Generally the lower the amount of polymethylolated phenolic material, the higher desirably is the peroxide concentration. Typical combinations are:

| Polymethylolated phenolic material, percent: | Organic peroxide percent |
| --- | --- |
| >0.25 | >0.25–3 |
| 1.0 | 0.25–3 |
| 0.25–40 | 0.5 |

Preferred levels of oxidation in the olefin polymers for these compositions are:

Peroxide, 1.2–2.3 mg./gm.
Carbonyl, 0.0016–0.013 absorbance/mil

Organic peroxides useful in the present invention are, generally, compounds composed of carbon, hydrogen, and oxygen, and have the general formula $R^1OOR^2$ wherein $R^1$ is an organic radical and $R^2$ is an organic radical or hydrogen. $R^1$ and $R^2$ can be hydrocarbon radicals or organic radicals substituted with a great variety of substituents.

Preferred classes include alkyl peroxides, e.g., t-butyl peroxide, alkyl substituted aryl peroxides, e.g., t-butyl perbenzoate, and aryl substituted alkyl peroxides, e.g., dicumyl peroxide. Specific compounds illustrative of these and other classes of organic peroxides are:

Cumene hydroperoxide
Di-tert-butyl peroxide
Dimethyl peroxide
Tetralyl hydroperoxide
n-Octyl hydroperoxide
Diethyl peroxide
t-Butyl hydroperoxide
t-Butyl perbenzoate
t-Butyl peracetate
Peracetic acid
Dibenzoyl peroxide
Bis(p-chlorobenzoyl)peroxide
Cyclohexanone peroxide
Diacetyl peroxide
Hydroxyheptyl peroxide
Dibutyryl peroxide
Dipropionyl peroxide
Dioctanoyl peroxide
Dilauroyl peroxide
Diisopropyl peroxydicarbonate
Bis(heptafluorobutyryl)peroxide
Bis(2,4-dichlorobenzoyl)peroxide
p-Menthane hydroperoxide
Pinane hydroperoxide
Dicumyl peroxide
Di-t-butyl diperphthalate
t-Butyl peroxyisobutyrate
Methyl ethyl ketone peroxide
2,5-dimethylhexane-2,5-dihydroperoxide and other organic peroxides such as are well known to those in the art.

*Examples 49–52.—Improvement in adhesion properties of oxidized polyethylene by reacting with polymethylolated phenolic materials and organic peroxides*

Ethylene homopolymer having a density of 0.92 and a melt index of 2.1 was oxidized by roll milling at 170° C. for 45 minutes to carbonyl absorbance/ml of 0.008 and 1.9 mg./g. of peroxide content and milled with 0.5% of a 2,4,6-trimethylolphenol. (Control I), a mixture of 2,4,6-trimethylolphenols and other polymethylolphenols (Control II), calcium 2,4,6-trimethylphenate (Control III) and dimethylolbisphenol sulfone (Control IV), and with 0.5% of a peroxide (Control V) and with 0.5% of a peroxide and 0.5% of 2,4,6-trimethylolphenol (Example 49), 0.5% of a mixture of 2,4,6-trimethylolphenol and other polymethylolphenols (Example 50), 0.5% of calcium 2,4,6-trimethylolphenate (Example 51) and 0.5% of dimethylolbisphenolsulfone (Example 52). A 20 mil film was removed from the rolls and placed between a 20 mil thick sheet of polyethylene and a solvent washed, cold rolled steel panel. The assembly was placed between cellophane wrapped polished platens and cured under 100–200 pounds/sq. in. at 170° C. for 10 minutes in a standard hydraulic steam heated press.

The peel adhesion of the polyethylene sheet was measured according to ASTM D–903 in the manner of Example 1.

Results are given in Table XI below.

TABLE XI.—OXIDIZED POLYETHYLENE REACTED WITH POLYMETHYLOLATED PHENOLIC MATERIALS AND PEROXIDES

| Example | Percent | Additive | Di-cumyl Peroxide, Percent | Adhesion (lbs./in.) | |
| --- | --- | --- | --- | --- | --- |
| | | | | Virgin 0.04 0.002 | Oxidized [1] 1.9 0.008 |
| Control I | 0.5 | TMP [2] | 0 | | 22 |
| II | 0.5 | TMP mix [3] | 0 | | 14 |
| III | 0.5 | CATMP [4] | 0 | | 12 |
| IV | 0.5 | DMBS [5] | 0 | | 7 |
| V | 0 | | 0.5 | | 8–9 |
| VI | 0 | | 0 | 1 | 3 |
| 49 | 0.5 | TMP | 0.5 | | 740 |
| 50 | 0.5 | TMP mix | 0.5 | | 35 |
| 51 | 0.5 | CATMP | 0.5 | | 32 |
| 52 | 0.5 | DMBS | 0.5 | | 26 |

[1] Sample milled 45 minutes in air at 170° C.
[2] 2,4,6-trimethylolphenol.
[3] Mix of 2,4,6-trimethylolphenol and other polymethylol phenols.
[4] 2,4,6-tris(hydroxymethyl) calcium phenate.
[5] Dimethylolbisphenol sulfone.

Example 53

Example 49 was duplicated but using unoxidized polyethylene, 6% 2,4,6-trimethylolphenol and 1% dicumyl peroxide. Results were:

TABLE XII.—UNOXIDIZED POLYETHYLENE REACTED WITH 2,4,6-TRIMETHYLOLPHENOL AND DICUMYL PEROXIDE

| Example | Percent 2,4,6-Trimethylolphenol | Dicumyl Peroxide | Polyethylene Adhesion (lb./in.) 0.004 mg./gm. peroxide and 0.002 carb. abs/mil |
|---|---|---|---|
| Control I | 6 | 0 | 28–29 |
| Control II | 0 | 1 | 2–3 |
| Example 54 | 6 | 1 | >40 |

What is claimed is:

1. Method for preparing modified alpha mono-olefin polymers characterized by increased molecular weight, higher thermal deformation temperatures, improved clarity, improved solvent resistance and improved adhesion which comprises blending to substantial homogeneity an alpha mono-olefin polymer selected from the group consisting of (a) an oxidized, alpha mono-olefin polymer having a peroxide content of from about 0.15 to about 3.5 milligrams per gram resin, (b) an alpha mono-olefin polymer containing from about 1 to about 15 percent by weight carboxyl groups which comprises at least 50 percent by weight of an alpha monoethylenically unsaturated hydrocarbon having from 2 to 4 carbon atoms inclusive, and up to 50 percent by weight of a carboxyl group containing monomer copolymerized with said hydrocarbon, and (c) an alpha mono-olefin polymer containing from about 0.5 to about 21 percent by weight hydroxyl groups which comprises at least 50 percent by weight of an alpha monoethylenically unsaturated hydrocarbon having from 2 to 4 carbon atoms inclusive, and up to 50 percent by weight of a hydroxyl group containing monomer copolymerized with said hydrocarbon, with from about 0.25 to about 40 percent by weight of a non-free-radical polymethylolated phenolic cross-linking agent having a plurality of phenolic nucleus attached methylol groups, and from about 0.25 to about 3 percent by weight of a free-radical organic peroxide cross-linking agent, and heating to effect a cross-linking of said olefin polymer.

2. Method for preparing modified alpha mono-olefin polymers characterized by increased molecular weight, higher thermal deformation temperatures, improved clarity, improved solvent resistance and improved adhesion which comprises blending to substantial homogeneity an alpha-mono-olefin polymer selected from the group consisting of (a) an oxidized, alpha mono-olefin polymer having a peroxide content of from about 0.15 to about 3.5 milligrams per gram resin, (b) an alpha mono-olefin polymer containing from about 1 to about 15 percent by weight carboxyl groups which comprises at least 50 percent by weight of an alpha monoethylenically unsaturated hydrocarbon having from 2 to 4 carbon atoms inclusive, and up to 50 percent by weight of a carboxyl group containing monomer copolymerized with said hydrocarbon, and (c) an alpha mono-olefin polymer containing from about 0.5 to about 21 percent by weight hydroxyl groups which comprises at least 50 percent by weight of an alpha monoethylenically unsaturated hydrocarbon having from 2 to 4 carbon atoms inclusive, and up to 50 percent by weight of a hydroxyl group containing monomer copolymerized with said hydrocarbon, with from about 0.25 to about 40 percent by weight of a non-free-radical polymethylolated phenolic cross-linking agent having a plurality of phenolic nucleus attached methylol groups and from about 0.25 to about 3 percent by weight of a free-radical organic peroxide cross-linking agent, and heating to effect a cross-linking of said olefin polymer.

3. Adhesive comprising an alpha mono-olefin polymer selected from the group consisting of (a) an oxidized, alpha mono-olefin polymer having a peroxide content of from about 0.15 to about 3.5 milligrams per gram resin, (b) an alpha mono-olefin polymer containing from about 1 to about 15 percent by weight carboxyl groups which comprises at least 50 percent by weight of an alpha monoethylenically unsaturated hydrocarbon having from 2 to 4 carbon atoms inclusive, and up to 50 percent by weight of a carboxyl group containing monomer copolymerized with said hydrocarbon, and (c) an alpha mono-olefin polymer containing from about 0.5 to about 21 percent by weight hydroxyl groups which comprises at least 50 percent by weight of an alpha monoethylenically unsaturated hydrocarbon having from 2 to 4 carbon atoms inclusive, and up to 50 percent by weight of a hydroxyl group containing monomer copolymerized with said hydrocarbon, cross-linked by heating with from about 0.25 to about 40 percent by weight of a non-free-radical polymethylolated phenolic cross-linking agent having a plurality of phenolic nucleus attached methylol groups.

4. Adhesive comprising an alpha mono-olefin polymer selected from the group consisting of (a) an oxidized, alpha mono-olefin polymer having a peroxide content of from about 0.15 to about 3.5 milligrams per gram resin, (b) an alpha mono-olefin polymer containing from about 1 to about 15 percent by weight carboxyl groups which comprises at least 50 percent by weight of an alpha monoethylenically unsaturated hydrocarbon having from 2 to 4 carbon atoms inclusive, and up to 50 percent by weight of a carboxyl group containing monomer copolymerized with said hydrocarbon, and (c) an alpha mono-olefin polymer containing from about 0.5 to about 21 percent by weight hydroxyl groups which comprises at least 50 percent by weight of an alpha mono-ethylenically unsaturated hydrocarbon having from 2 to 4 carbon atoms inclusive, and up to 50 percent by weight of a hydroxyl group containing monomer copolymerized with said hydrocarbon cross-linked by heating with from about 0.25 to about 40 percent by weight of a non-free-radical polymethylolated phenolic cross-linking agent having a plurality of phenolic nucleus attached methylol groups and from about 0.25 to about 3 percent by weight of a free-radical organic peroxide cross-linking agent.

5. Method for preparing modified alpha mono-olefin polymers which comprise blending to substantial homogeneity a alpha mono-olefin polymer with from about 0.25 to about 10 percent by weight of a non-free-radical polymethylolated phenolic cross-linking agent having a plurality of phenolic nucleus attached methylol groups and from about 0.25 to about 3 percent by weight of a free-radical organic peroxide cross-linking agent, and heating to effect a cross-linking of said olefin polymer.

6. Adhesive comprising an alpha mono-olefin polymer cross-linked by heating with from about 0.25 to about 10 percent by weight of a non-free-radical polymethylolated phenolic cross-linking agent having a plurality of phenolic nucleus attached methylol groups and from about 0.25 to about 3 percent by weight of a free-radical organic peroxide cross-linking agent.

References Cited by the Examiner
UNITED STATES PATENTS

| | | | |
|---|---|---|---|
| 2,874,137 | 2/59 | Pisanchyn et al. | 260—848 |
| 2,894,925 | 7/59 | Morris et al. | 260—848 |
| 2,902,459 | 9/59 | Teppema | 260—848 |

MURRAY TILLMAN, *Primary Examiner.*

JAMES A. SEIDLECK, *Examiner.*